UNITED STATES PATENT OFFICE.

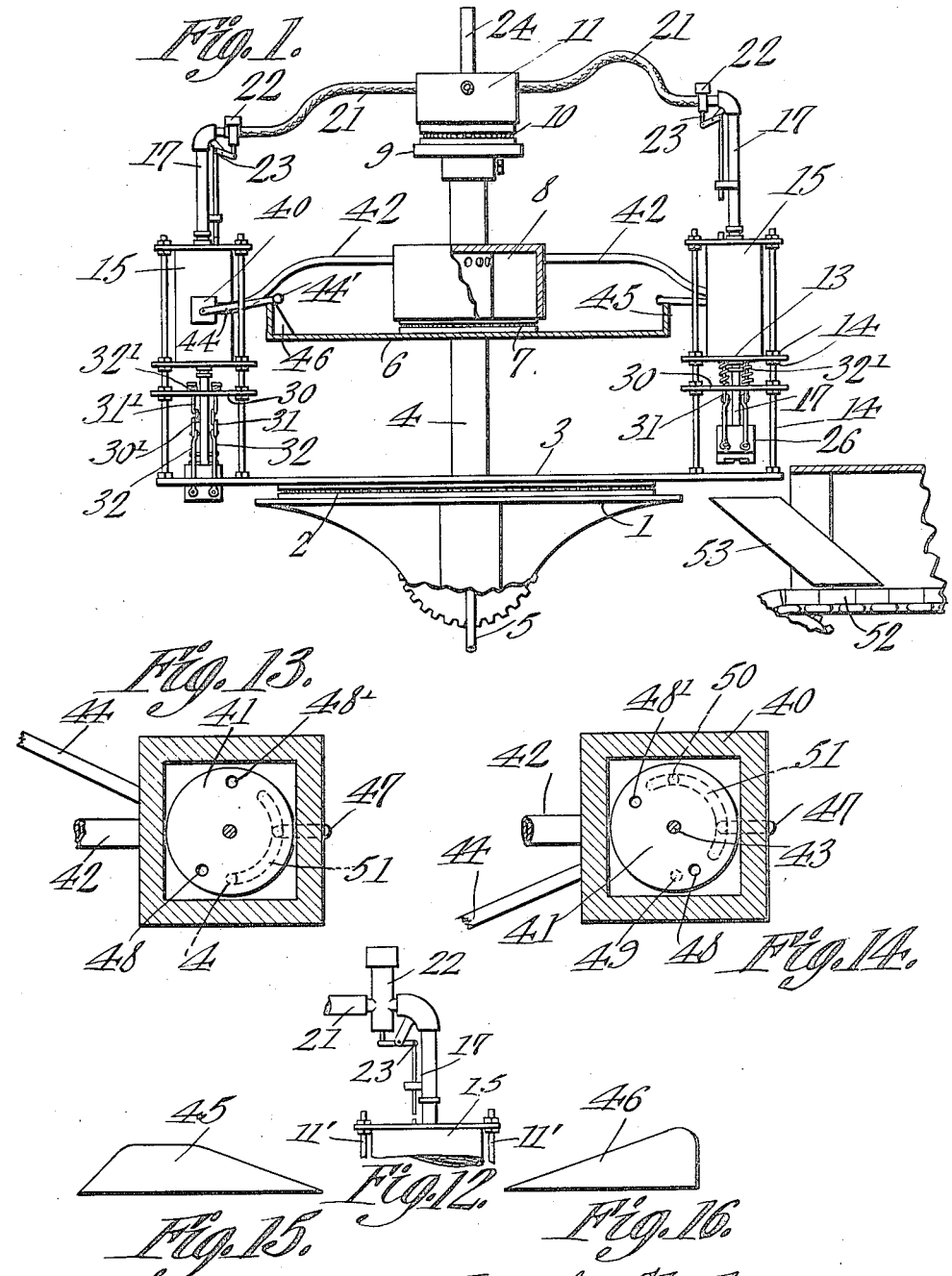

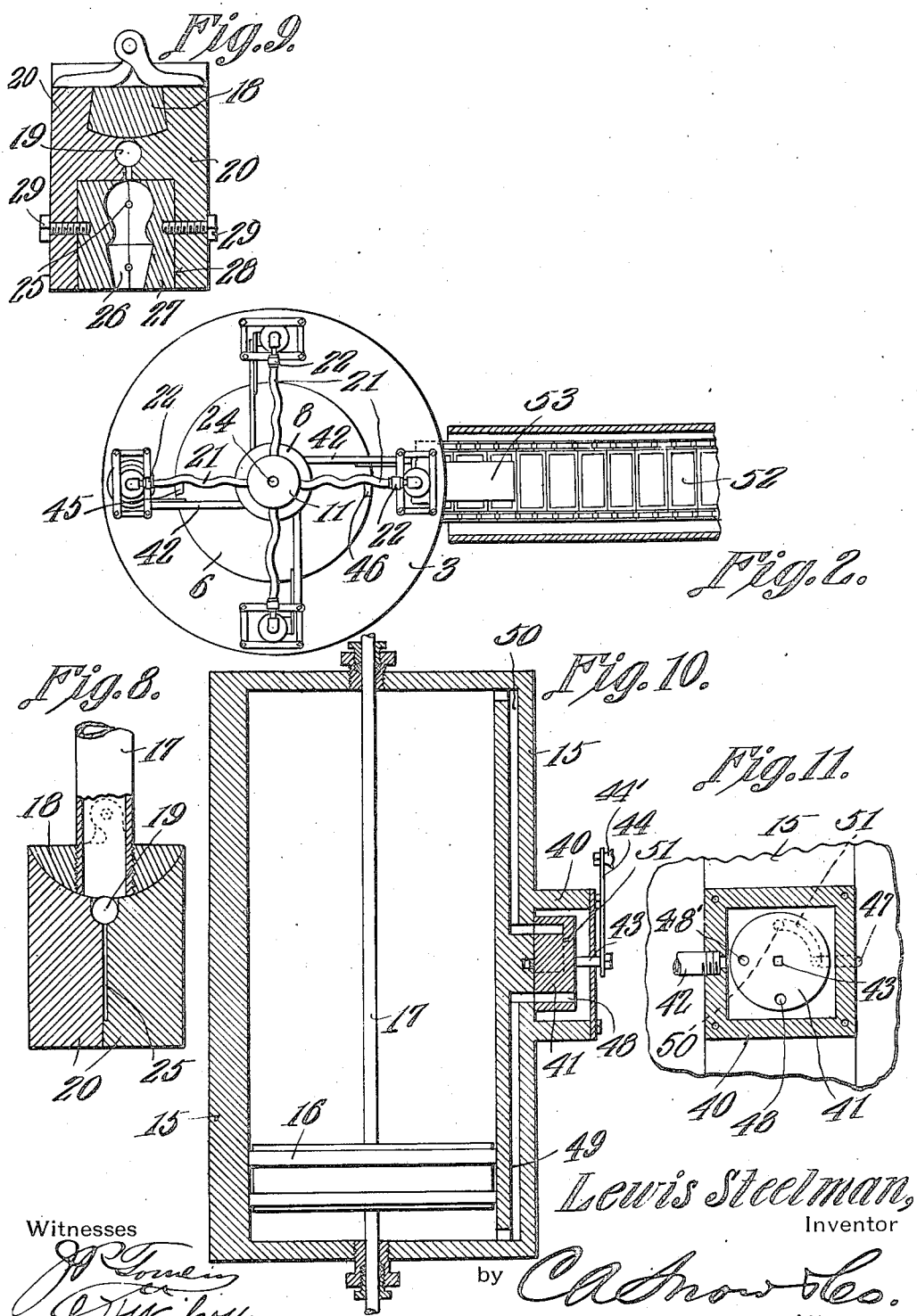

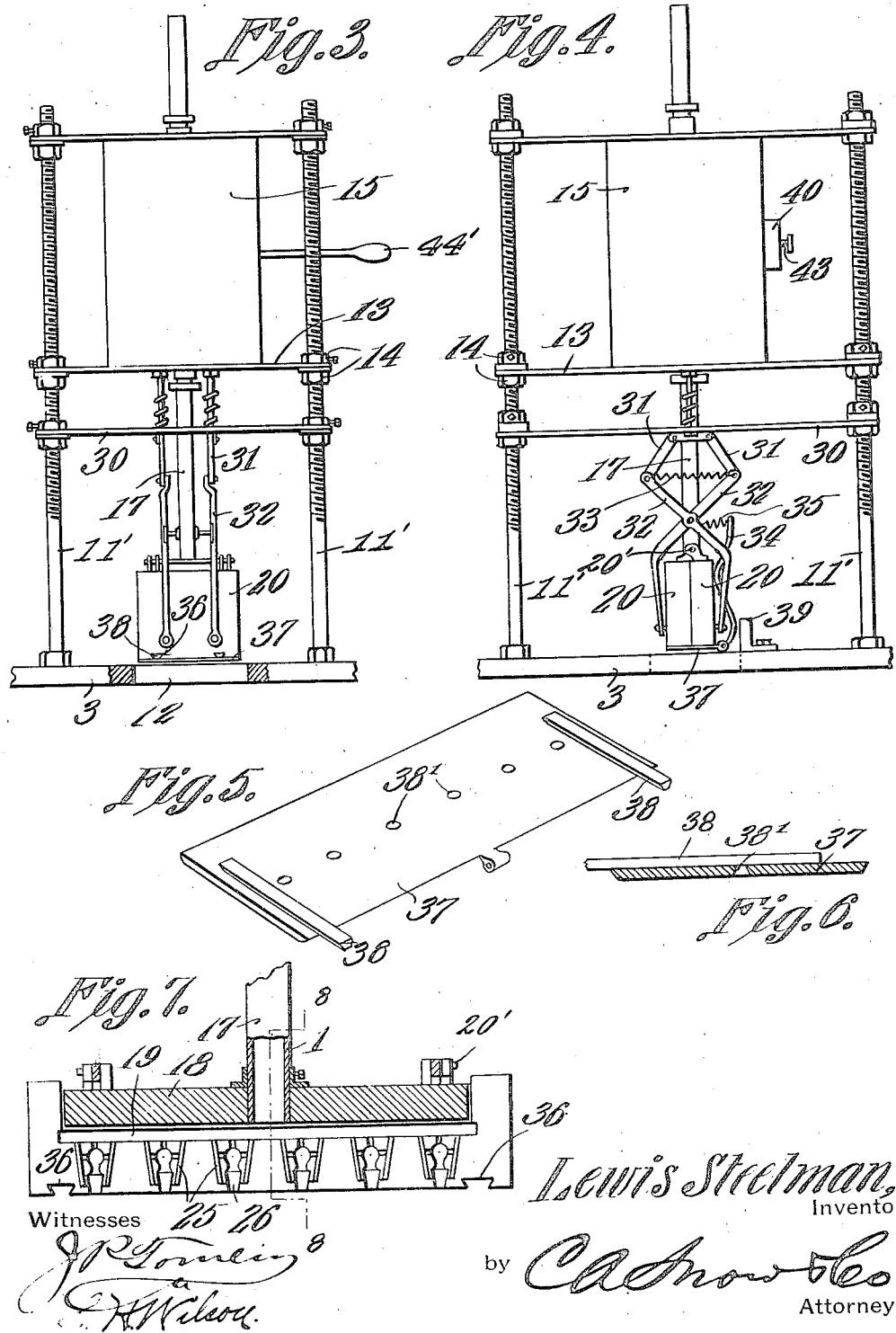

LEWIS STEELMAN, OF MILLVILLE, NEW JERSEY.

MACHINE FOR GATHERING AND MOLDING GLASS ARTICLES.

1,182,811. Specification of Letters Patent. Patented May 9, 1916.

Original application filed September 29, 1910, Serial No. 584,531. Divided and this application filed March 31, 1911. Serial No. 618,155.

*To all whom it may concern:*

Be it known that I, LEWIS STEELMAN, a citizen of the United States, residing at Millville, in the county of Cumberland and State of New Jersey, have invented a new and useful Machine for Gathering and Molding Glass Articles, of which the following is a specification.

This invention has relation to machines for gathering and molding glass articles and consists in the novel construction and arrangement of its parts as hereinafter described and claimed.

The object of the invention is to provide a machine especially adapted to be used to gather and mold a plurality of solid articles of glass at one time, as, for instance, bottle stoppers, but it may be used to advantage for gathering and forming a plurality of other articles at one time including hollow articles.

Primarily it consists of a table mounted for rotation and which carries gathering devices adapted to remove the metal from pots or other receptacles and at the same time form the articles in series and carry the said articles to a leer and deposit the same for annealing purposes. Pneumatic means are provided for projecting the gathering devices into the metal and suction draft means are provided for sucking the metal from the pot in the said gathering devices.

In the accompanying drawings,—Figure 1 is a side elevation of the machine; Fig. 2 is a top plan view of the same; Fig. 3 is a side elevation of one of the gathering devices used upon the machine; Fig. 4 is a side elevation of one of the gathering devices used upon the machine showing the same at a right angle to the view illustrated in Fig. 3; Fig. 5 is a perspective view of a metal cutting knife used upon the machine; Fig. 6 is a sectional view of said knife; Fig. 7 is a longitudinal sectional view of the mold of one of the gathering devices; Fig. 8 is a transverse sectional view of said mold, said section being taken on the line 8—8 Fig. 7; Fig. 9 is a transverse sectional view of a modified form of mold; Fig. 10 is a sectional view of a cylinder forming a part of the machine; Fig. 11 is a side elevation of a portion of said cylinder with parts in section; Fig. 12 is an elevation, on an enlarged scale, of one of the valves and adjacent mechanism; Figs. 13 and 14 are views similar to Fig. 11 and showing the position of the valve in various stages of its movement; Figs. 15 and 16 are detail views of the tappet.

The gathering machine consists of a platform 1 which is provided upon its upper surface with a ball race which receives bearing balls 2. A table 3 is provided upon its under side with a ball race which bears against the upper portions of the bearing balls 2. Any suitable means (not shown) may be provided for rotating the said table at intervals. A vertically disposed pipe 4 passes up through the center of the table 3 and an air pipe 5 is arranged to discharge into the said pipe 4. A disk 6 is fixed to the upper portion of the pipe 4 and is provided upon its upper side with a race which receives bearing balls 7. A distributing tank 8 is provided upon its underside with a ball race which bears upon the said bearing balls 7. The said distributing tank 8 is arranged to receive air from the pipe 4. In other words the interiors of the said pipe and distributing tank communicate. A bracket 9 is mounted upon the upper end of the pipe 4 and is provided upon its upper side with a ball race which receives the bearing balls 10. A drum 11 is provided upon its under side with a ball race which bears upon the upper portion of said bearing balls 10.

A series of glass gathering and molding mechanisms is mounted upon the table 1 and as all of the said mechanisms are of the same structural arrangement, a description of one will answer for all. Each gathering and molding mechanism consists of four rods 11' rectangularly arranged and extending vertically from the table 1. The table 1 is provided with an opening 12 between each set of rods. The upper portions of the rods are externally screw-threaded and plates 13 are secured in adjusted positions thereon by means of jam nuts 14. Cylinders 15 are secured to each plate 13 and the structural details of said cylinders will be explained hereinafter. A piston 16 is located in each cylinder 15 and is mounted upon a hollow piston rod 17 which passes through the opposite ends of the said cylinder 15. Head blocks 18 are connected with the lower ends of the hollow piston rods 17 and are provided with distributing channels 19 with which the said piston rods 17 communicate. Mold sides 20 are hingedly connected as at 20′ with the head blocks 18 and are adapted to close together under the said head blocks while their pivotal connections are above the upper sides of the said head blocks. The upper ends of all of the hollow piston rods 17 are connected with the drum 11 each by means of a flexible hose section 21 and the said hollow piston rods 17 are provided at their upper ends with valves 22. Each valve 22 is provided with suitable mechanism 23 which, when brought in contact with the upper end of the cylinder 15 is adapted to open the valve. On the contrary when the said valve mechanism 23 is moved away from the upper end of the cylinder 15, the said valve 22 is adapted to close.

A suction draft pipe 24 is connected with the drum 11 and through the hose section 21 and the hollow piston rod 17 when the valves 22 are open. The mold sides 20 are also provided with air passages 25 which connect the channels 19 with recesses 26 provided in the said mold sides. It is in the said recesses 26 that the glass articles are formed when the mold sides are together and the material is drawn up into said recesses through the suction draft created through the passages 25, channels 19 and hollow rod 17 as will be hereinafter explained.

Instead of providing the recesses 26 directly in the faces of the mold sides 20 as described and as shown in Fig. 7 of the drawing, the said recesses 26 may be provided in blocks 27 which are inserted in recesses 28 as illustrated in Fig. 9 of the drawing, and secured therein by means of screws 29 or other securing devices. By providing these detachable blocks, the surfaces thereof between which the metal is received may be provided with different or variegated designs whereby during the same gathering and molding operation, stoppers of different patterns may be produced.

A head 30 is supported upon the rods 11′ below the lowermost plate 13 and the hollow piston rod 17 passes down through the said head. The upper ends of links 31 are pivotally connected to horizontal links 30′, and guide rods 31′ extend upwardly from the links 30′ and are slidably mounted within the head 30, these rods having springs 32′ thereon for yieldingly supporting links 30′. The upper ends of tong members 32 are pivotally connected to the lower ends of said links 31. The lower ends of the links 31 and the upper ends of the tong members 32 are connected together in a direction transversely of the hollow piston rods 17 by means of a traction spring 33. The spring has a tendency to draw the lower ends of the links and the upper ends of the tong members 32 toward each other. The mold sides 20 are attached to the lower ends of the tong members 32 and are adapted to be swung to open and closed position in consequence of the operation of the tong members in the manner hereinafter described. An arm 34 is pivotally mounted upon one of the mold sides 20 and the upper end of the arm is connected with the intermediate portions of the tong members 32 by means of a traction spring 35. The tension of this spring 35 is such as to have a tendency to draw the upper end of the arm 34 toward the pivotal point of connection between the tong members 32. The mold sides 20 are provided at their lower edges with guides 36, the side walls of which diverge from each other in an upward direction. A knife 37 is attached to the lower end of the arm 34 and is provided with ribs 38 which fit snugly in the guides 36 provided at the lower edges of the mold sides 20, but which are adapted to move longitudinally therein. The said knife 37 is provided with a series of openings 38′ which at times are adapted to register with the lower ends of the recesses 26 provided in the inner faces of the mold sides 20. Stops 39 are mounted upon the table 1 adjacent the recesses 12 provided in the edge thereof and engage the outer sides of the arms 34 and are adapted to swing the said arms as the mold sides are moved vertically through the openings 12 in a manner as will be explained hereinafter.

Each cylinder 15 is provided at one side with a valve casing 40 and an oscillatory valve 41 is journaled in said casing. A pipe 42 connects the casing with the tank 8 and is adapted to lead air from the said tank through the valve casing. The stem 43 of the valve 41 projects through the side of the casing 40 and is provided with a lever 44 which extends over the edge of the disk 6. The disk 6 is provided upon its upper surface and at one side with an upstanding tappet 45 and at its diametrically opposite side with an upstanding tappet 46. These tappets are located in the paths of movement of the inner ends of the levers 44 and the tappet 46 has greater height than the tappet 45. Each lever 44 has a weighted end 44′ in the form of a handle and which acts to hold the valve normally against plate 6. The valve casing 40 is provided with an exhaust outlet 47 and the valve 41 is provided with transversely disposed ports 48 and 48′. The cylinder 15 is provided in its side with fluid pressure passages 49 and 50 the inner ends of which open into the valve casing 40, and the outer end of the passage 49 communicates with the interior of the cylinder 15 at one end thereof and the outer end of the passage 50 communicates with the interior of the cylinder 15 at the other end thereof. The valve 41 is arranged to operate over the inner ends of the said passages 49 and 50. The valve 41 is also provided with a by-pass 51 which at times is adapted to establish communication between the inner end of the passage 50 and the exhaust outlet 47 and at other times is adapted to establish communication between the inner end of the passage 49 and the exhaust outlet 47.

An annealing leer 52 is located adjacent the delivery edge of the table 1 and the upper end of a chute 53 is disposed under the delivery edge of the table 1 and enters the said leer.

The operation of the machine is as follows: The table 1 rotates and comes to a state of rest. When the said table 1 is at rest, one of the glass gathering and molding devices is directly above the receptacle (not shown) which contains the molten metal. At the same time, the lever 44 upon cylinder 15 of the positioned glass gathering device rides upon the tappet 46 and the lever is swung upwardly so that the valve 41 is turned whereby the port 48' is brought into register with the inner or lower end of the air passage 50 and at the same time the by-pass 51 establishes communication between the exhaust outlet and the upper end of the passage 49. These positions have been indicated in Fig. 13. Thus fluid pressure which is admitted into the casing 40 in the manner as above described may pass through the said port 48' and into the passage 50 and above the piston 16 located in the cylinder 15. At the same time fluid pressure from the lower end of said cylinder is exhausted and the piston 16 is moved in a downward direction which carries with it the hollow piston rod 17. Thus the mold sides 20 are pushed down into the metal. As the rod 17 descends, the valve mechanism 23 comes in contact with the upper end of the cylinder 15 and the valve 22 is opened whereby suction draft is established through the pipe 21 and inasmuch as this pipe is connected with the hollow piston rod 17, and with the passage 19 and its branches, the metal is drawn up into the recesses 26. After the metal has been drawn between the mold sides in the manner as indicated, the table rotates and the lever glides gradually off of the tappet 46 and slowly gravitates to its initial position, thus first returning the port 48 into register with passage 49, as shown in Fig. 11, and then moving said port past the passage 49 and opposite the solid wall of cylinder 15 as shown in Fig. 13. When the port 48 momentarily registers with the inner end of the passage 49 the by-pass 51 establishes communication between the inner end of the passage 50 and the exhaust outlet 47. Thus the fluid pressure passes from the casing 40 down through the passage 47 under the piston 16 and the fluid pressure in the upper portion of the cylinder 15 is permitted to exhaust through the passage 50 and the exhaust outlet 47. Thus the piston 16 and its attachments are elevated and the mold is drawn up above the surface of the table 1. When the hollow piston rod 17 moves in a vertical direction as above indicated, the valve gear 23 is carried away from the top of the cylinder 15 and the valve 22 automatically closes, whereby the suction draft is interrupted. This downward movement of the lever 44 while leaving the tappet 45 is just slow enough to allow the port 48 and passage 49 to register momentarily to permit a sufficient quantity of fluid pressure to enter the cylinder 15 to lift the lower edge of the mold sides 20 above the upper surface of the table. When this quantity of fluid pressure has been admitted into the cylinder, the lever 44 leaves the tappet 45 and reaches the lowermost position so that the port 48 is carried beyond register with the end of the passage 49 and stops adjacent a solid portion of the cylinder 15 as shown in Fig. 14, whereby communication between the interior of the valve casing 40 and the interior of the cylinder 15 is interrupted and the fluid pressure contained therein is trapped. When the lever 44 comes in contact with the tappet 45, it is again elevated to the position shown in Fig. 11 and port 48 brought into register with passage 49 whereby more air is permitted to pass from the casing 40 into the lower end of the cylinder 15. Up to this time the mold sides 20 contain the metal between them and said metal has had sufficient time to cool to form a solid article. Upon the further upward movement on the part of the hollow piston rod 17, the mold sides 20 are drawn toward the head 30 to such an extent that the links 31 and the members 32 of the tongs bear outwardly against the tension of the spring 33 and the said mold sides 20 swing open away from each other, and the articles molded fall from the same upon the chutes 53 down which they roll into the leer 52. As soon as this is done the lever 44 passes beyond the tappet 46 and the tension of the spring 33 comes into play and the mold sides swing together and the parts assume normal or original positions.

At the time that the mold sides 20 are projected down toward and through the opening 12 in the table 1, the arm 34 first comes into contact with the stop 39 and is shifted so as to bring the openings 38' of the knife 37 into register with the lower ends of the recesses 26 provided in the mold sides 20. The wall of opening 12 engages arm 34 after it leaves the stop 39 and holds the knife in shifted position while the mold is in its lowermost position. Thus the metal may pass up through the openings 38' into said recesses 26. When the mold sides 20 are moved in an upward direction, the outer side of the arm 34 is moved out of contact with the stop 39 and the said arm 34 swings upon its pivot under the action of spring 35 whereby the knife 37 is moved transversely across the lower edge of the mold sides 20 and the openings 30 are carried out of register with the lower ends of the recesses 26 in the mold side. Thus the metal or glass is shorn from the lower edges of the mold sides at the time that the said mold sides are moved in a vertical direction away from the body of the metal.

The subject matter of this invention is divided from the matter revealed in my earlier application for patent for machine for gathering and molding glass articles filed in the Patent Office Sept. 29, 1910, Serial No. 584,531.

Having described the invention what I claim as new and desire to secure by Letters Patent is:—

1. A gatherer comprising hingedly connected mold blocks having a plurality of registering recesses, there being suction passages for maintaining communication between the recesses, a knife extending across the bottoms of the mold blocks and having openings normally registering with the open ends of the recesses in the blocks, means for lowering the blocks into metal, means for creating a suction through the openings in the knife and into all of the recesses simultaneously to suck metal into the recesses, and means for automatically shifting the knife during the movement of the blocks in one direction to shift the knife openings out of register with the recesses and sever the gathers.

2. A gatherer comprising hingedly connected mold sections having communicating recesses, said recesses being open at their lower ends, a knife extending across the bottoms of the members and having apertures normally registering with the lower ends of the recesses, means for establishing a suction through the recesses simultaneously during the movement of the mold members downwardly into the metal to be gathered, and separate means operated by the upward movement of the mold members for successively shifting the knife to move its apertures out of register with the recesses and sever the gathers, and to shift the mold members apart.

3. A gatherer comprising hingedly connected mold members having communicating recesses, said recesses being open at their lower ends, a knife extending across the bottoms of the members and having apertures normally registering with the lower ends of the recesses, means for establishing a suction through the recesses simultaneously during the movement of the mold members downwardly into the metal to be gathered, separate means operated by the upward movement of the mold members for successively shifting the knife to move its apertures out of register with the recesses and sever the gathers, and to shift the mold members apart, the mold members being movable from one gathering position to delivering position between the severing of the gathers and the movement of the mold members from each other.

4. A gatherer comprising a revoluble table, hingedly connected mold members having recesses therein open at their lower ends, a knife extending under said members and having apertures normally registering with the lower ends of the recesses, pressure operated means for lowering the mold members into the metal to be gathered, means for automatically applying suction through the members for drawing metal into the recesses when the mold members are in lowered position, coöperating means upon the table and mold members for automatically shifting the apertures in the knife out of register with the recesses during the upward movement of the mold members, thereby to sever the gathers.

5. A gatherer comprising a revoluble table, hingedly connected mold members having recesses therein open at their lower ends, a knife extending under said members and having apertures normally registering with the lower ends of the recesses, pressure operated means for lowering the mold members into the metal to be gathered, means for automatically applying suction through the members for drawing metal into the recesses when the mold members are in lowered position, coöperating means upon the table and mold members for automatically shifting the apertures in the knife out of register with the recesses during the upward movement of the mold members, thereby to sever the gathers, the table being revoluble subsequent to the severing of the gathers, whereby to bring the mold members to delivering position, and means for further elevating the mold members when brought into position above the point of delivery to shift said members apart and deliver the molded objects therefrom.

6. A gatherer comprising a table, hingedly connected mold members movably supported thereabove, pressure operated means for lowering said mold members into the metal to be gathered, means for automatically creating suction through the mold members to draw metal into the members while the members are in lowered position, pressure operated means for automatically elevating the mold members subsequent to the gathering of metal therein, coöperating means upon the table and one of the mold members for automatically cutting off the gathers during the upward movement of the mold members, the table being revoluble subsequent to such elevation of the mold members, and means for further elevating the mold members when brought to a position above their point of discharge, for swinging the said members apart to deliver the molded objects.

In testimony that I claim the foregoing as my own, I have hereto affixed my signature in the presence of two witnesses.

LEWIS STEELMAN.

Witnesses:
W. F. WHEATON,
J. W. MITCHELL.